United States Patent [19]

Pfaffmann

[11] Patent Number: 4,715,907
[45] Date of Patent: * Dec. 29, 1987

[54] METHOD FOR HEAT TREATING FERROUS PARTS

[75] Inventor: George D. Pfaffmann, Farmington, Mich.

[73] Assignee: Tocco, Inc., Boaz, Ala.

[ * ] Notice: The portion of the term of this patent subsequent to Jan. 20, 2004 has been disclaimed.

[21] Appl. No.: 899,323

[22] Filed: Aug. 22, 1986

Related U.S. Application Data

[62] Division of Ser. No. 752,550, Jul. 8, 1985, Pat. No. 4,637,844.

[51] Int. Cl.⁴ ............................................ C21D 11/20
[52] U.S. Cl. .................................... 148/144; 148/146; 148/150; 148/154
[58] Field of Search ........................ 148/143, 144–150, 148/154, 157

[56] References Cited

U.S. PATENT DOCUMENTS 2,598,694 6/1952 Heibenar ............................ 148/147

Primary Examiner—Christopher W. Brody
Attorney, Agent, or Firm—Body, Vickers & Daniels

[57] ABSTRACT

Ferrous parts are heat treated by preheating the part to an elevated temperature, inductively heating the preheated part to an austenitizing temperature followed by quenching and isothermal transformation in a media maintained at a predetermined isothermal transformation temperature.

3 Claims, 6 Drawing Figures

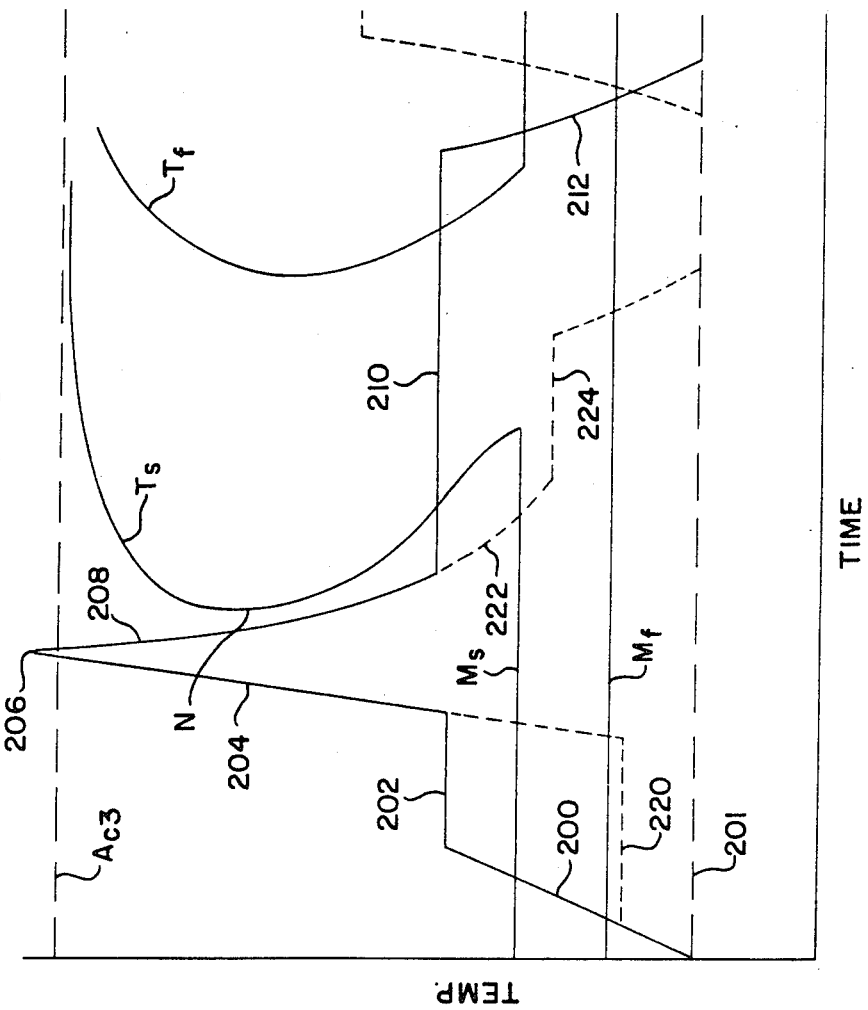

METHOD FOR HEAT TREATING FERROUS PARTS

This is a division of application Ser. No. 752,550, filed July 8, 1985, now U.S. Pat. No. 4,637,844.

BACKGROUND

The present invention relates to the heat treating of workpieces and, in particular, to inductive heating of the workpieces followed by arrested cooling of the workpieces to achieve improved metallurgical properties.

The invention will be described with reference to the austempering of annular configured parts, such as gears; however, the invention, in its broader aspects may be employed for other arrested cooling processes such as martempering wherein improved metallurgical properties are desired.

Austempering has been recognized as an effective heat treating process for increasing the hardness, ductility, toughness and fatigue resistance of certain cast ferrous parts, as well as reducing heat treating distortion, dimensional variation and quench cracking. Parts such as ring gears, pinions and the like, particularly in automotive applications, benefit from such process. In a typical process, the entire part is heated to an austenitizing temperature for an extended soaking period, up to three hours or more, sufficient to provide the desired metallurgical dissolution of the graphite and carbon constituents. Thereafter, the part is immersed in a salt bath, maintained at an appropriate temperature at or above the starting martensite transformation temperature and below the pearlite transformation temperature. The bath media rapidly quenches the part from the austenitizing temperature past the nose of the TTT curve and maintains an elevated uniform part temperature. At this isothermal transformation temperature the formation of lower bainite is promoted to the exclusion of martensite and intermediate transformation products, such as pearlite and upper bainite. After an extended holding period at the isothermal transformation temperature, also oftentimes three hours or more, the part is air or liquid cooled to ambient temperature. In addition to extremely long cycle times, the criticality of the quenching rates has limited the process to small section parts of irons and steels with good hardenability. For low hardenability parts and larger part sections, the isothermal transformation temperature is not uniformly obtained prior to passing through the other elevated transformation regions and consequently inhibiting a uniform bainite transformation.

SUMMARY OF THE INVENTION

The present invention provides an energy efficient, short-cycle austempering process for providing improved metallurgical and physical properties to the exterior surface of parts requiring extended service life under high stress operation. This is achieved through the inductive heating of the part to obtain an austenitizing temperature to a substantial depth, in a short period of time which is nonetheless effective to promote the desired metallurgical carbon and/or graphite dissolution. The induction heating, being confined to the outer surface of the part, does not significantly raise the temperature of the part interior. After the induction heating cycle, the part is immersed into a bath media maintained at the desired isothermal transformation temperature. Inasmuch as the heated exterior is encapsulated by both the cool interior core and the bath media, the requisite cooling rate is obtained regardless of part cross-section, thereby also permitting the use of material with lesser hardenability than previously possible. This quenching can be further enhanced by preheating the part to around the isothermal transformation temperature whereby the entire austenitic region may be simultaneously exposed to the desired temperature during the quenching to the isothermal transformation temperature. The rapid inductive heating of only the desired exterior zone to the austenitic temperature substantially reduces the heating energy in comparison with the prior soaking approaches. Further, in addition to improved quenching control, the equipment and energy demands on the isothermal quencher are reduced. After holding time in the bath dependent on the part material, the parts are removed and air or liquid quenched in an in-line extension of the overall manufacturing process.

Accordingly, it is an object of the present invention to provide an improved heat treatment for parts requiring high hardness, toughness, ductility and fatigue resistance.

Another object of the invention is to provide a compact, in-line energy efficient process and apparatus for providing austempered properties to heat treated parts.

A further object of the invention is to provide an arrested cooling heat treating process utilizing the benefits of induction heating.

Still another object of the invention is to provide a method of isothermally heat treating parts including preheating the part to around a desired isothermal transformation temperature, inductively heating the exterior of the part to an elevated austenitizing temperature to a substantial depth, and immersing the part in an isothermal bath utilizing part temperature and bath temperature to rapidly establish a uniform isothermal transformation temperature zone for the heated exterior.

BRIEF DESCRIPTION OF THE DRAWINGS

The above and other advantages of the present invention will become apparent from the following description taken in conjunction with the accompanying drawings in which:

FIG. 6 is a transformation diagram of the heat treating process of the present invention.

DETAILED DESCRIPTION OF THE INVENTION

Figure 1:
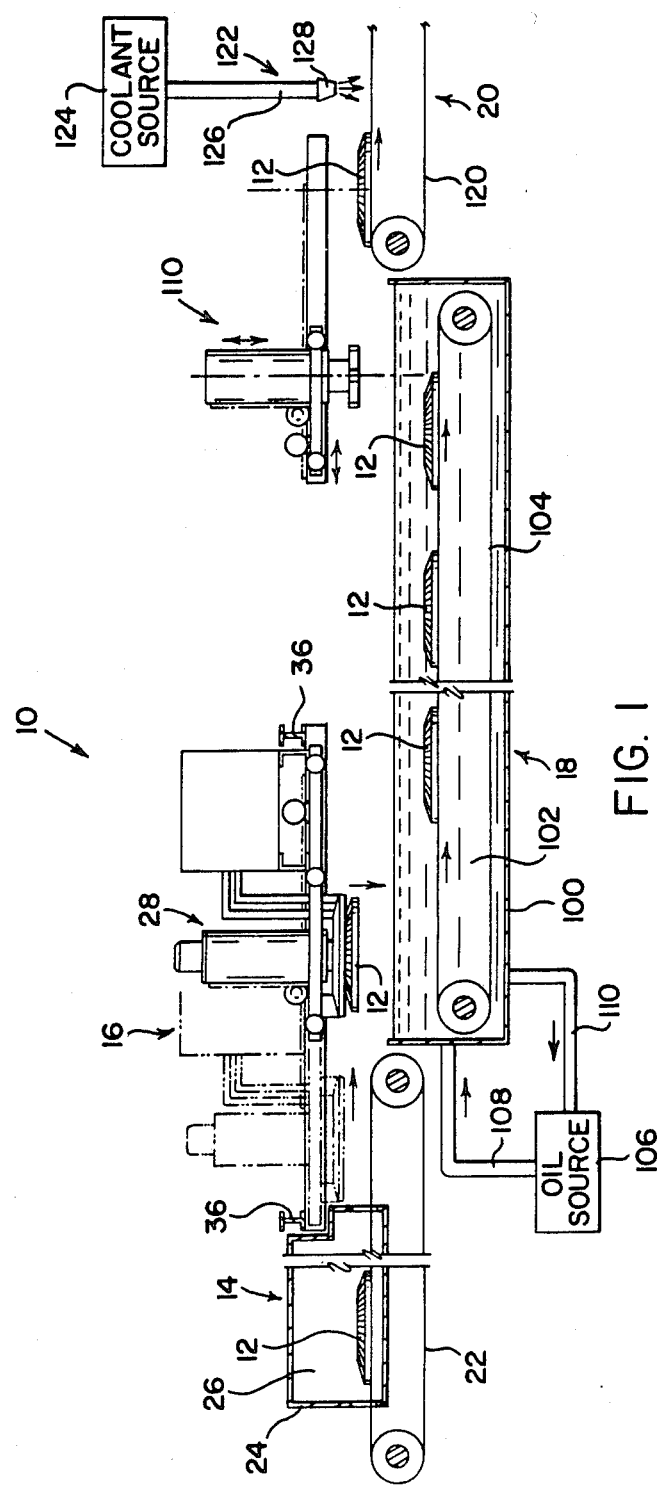
FIG. 1 is a fragmentary side elevational view of a heat treating apparatus in accordance with the invention.

Referring to the drawings for the purposes of illustrating the preferred embodiment only and not for limiting same, FIG. 1 illustrates a heat treating apparatus 10 for heat treating ferrous workpieces 12, such as ring gears, moving along a horizontal conveyor path through a preheating zone 14, an induction heating zone 16, an isothermal quenching zone 18 and a cooling zone 20. The workpieces 12 arrive from an upstream processing operation, not shown, on an endless conveyor belt 22 which is substantially enclosed by a preheating furnace 24. The preheating furnace 24 defines an interior cavity 26, the temperature of which is maintained at an elevated temperature substantially around the isothermal transformation temperature of the workpiece material. The temperature of the furnace 24 may be maintained by conventional control, suitable gas, electrical heaters or the like. The length of the preheating zone 14 and accordingly the speed of the conveyor belt 22 and size of the furnace 24 provides a uniform heating of the workpiece from its entering ambient temperature to a temperature, adjacent the exit end of the preheating zone 14, substantially around the aforementioned isothermal transformation temperature.

As hereinafter described in greater detail, the workpieces 12 at the exit end of the preheating zone 14 are removed from the furnace 24 by an induction heating and transfer assembly 28 which is reciprocable horizontally between the leftward position illustrated in dashed lines and the rightward position illustrated in the solid lines.

Figure 2:
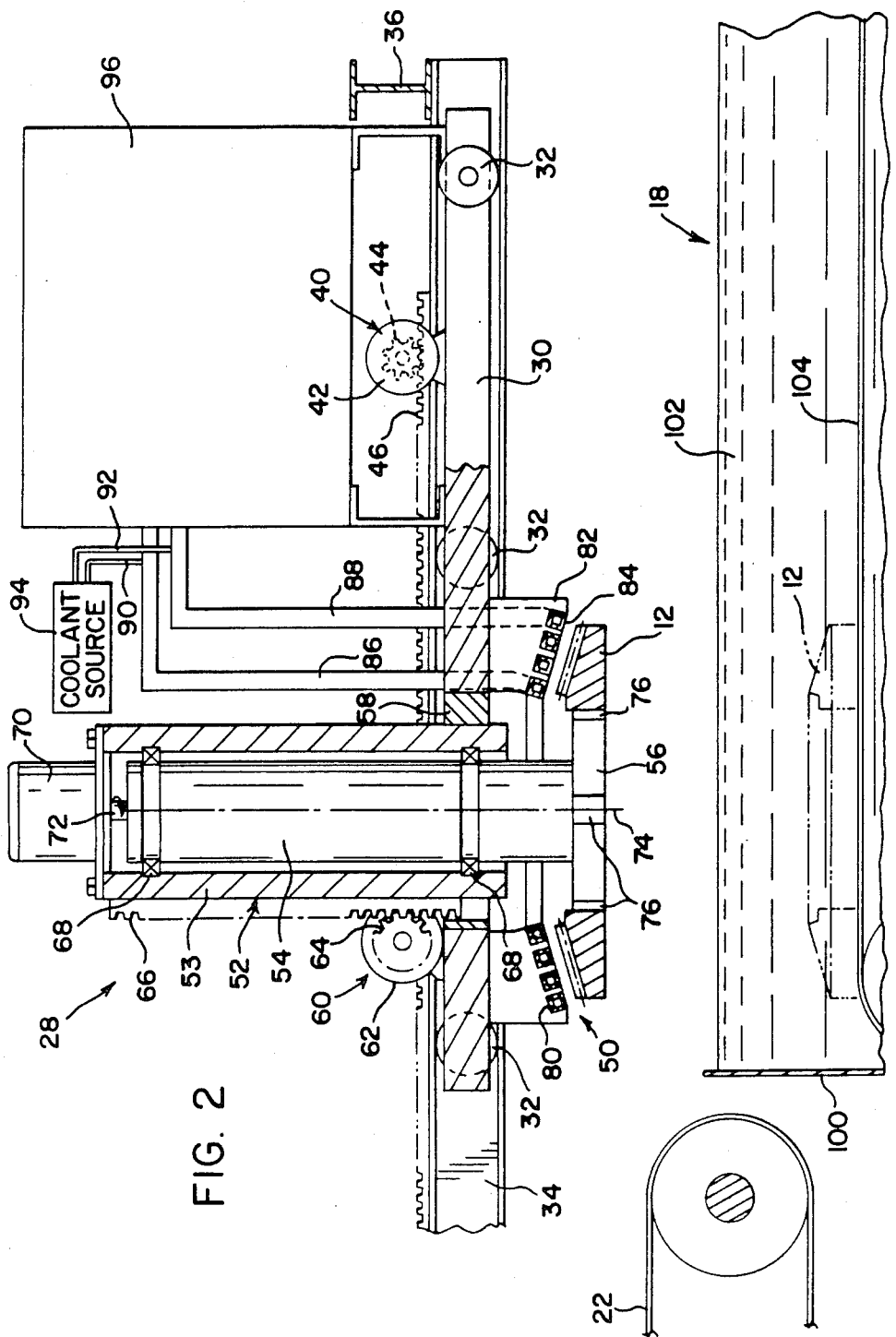
FIG. 2 is a fragmentary view of the preheating zone, the induction heating zone and the quench zone.

Referring additionally to FIG. 2, the heating and transfer assembly 28 comprises a platform 30 which is supported by bearings 32 on a pair of laterally spaced horizontal tracks 34 attached to framework 36. A rack and pinion drive unit 40 carried on the platform 30 includes a control motor 42 having an output pinion 44 which engages a rack 46 carried by the framework 36. Accordingly, actuation of the drive unit 40 will effect horizontal translation of the assembly 28 between the illustrated positions.

The transfer assembly 28 additionally includes an induction heating assembly 50 secured to the lower surface of the platform 30 adjacent the leftward end thereof, and a telescoping sleeve assembly 52 coaxially disposed therewith. The sleeve assembly 52 comprises a vertically translatable cylindrical sleeve 53 rotatably supporting a shaft 54 and having an expandable collet 56 carried at its lower end. The sleeve 53 is vertically slidably supported in a cylindrical bushing 58 carried by the platform 30. A drive unit 60 mounted on the top surface of the platform 30 includes a motor 62 having an output pinion 64 which drivingly engages a rack 66 carried on the outer surface of the sleeve 53 and projecting through an axial slot in the bushing 58. Selective actuation of the drive unit 60 operating through the pinion 64 and the rack 66 will selectively vertically raise and lower the sleeve 53 with respect to the platform 30. The shaft 54 is rotatably supported interior of the sleeve 52 by means of axially spaced bearings 68. An electric motor 70 mounted on the upper end face of the sleeve 53 includes an output shaft 72 connected to the shaft 54. Energization of the motor 70 will accordingly rotate the shaft 54 and the collet 56 about a vertical axis 74. The collet 56 may be any suitable fluidly or mechanically actuated device having a plurality of circumferentially spaced jaws 76 which may be expanded radially outwardly or retracted radially inwardly by suitable control means, not shown. In the present instance, the outer circumference of the collet 56 in the retracted position has a telescopic sliding fit with respect to the bore of the workpiece 12. Accordingly, upon energization of the collet actuator, the jaws 76 expand outwardly compressively gripping the surface of the bore and permitting the collet 56 and the associated workpiece 12 to be vertically shifted by the drive unit 60 between operative positions hereinafter described. The induction heating assembly 50 includes multiple turn inductor coil 80 fixedly supported by an insulating carrier 82 connected to the lower surface of the platform 30. The coil 80 is formed of a rectangular cross-sectional hollow tubing having an inner conical surface 84. The coil 80 includes two leads 86, 88 projecting upwardly through the platform 30 and having horizontal upper portions connected to the output leads of a high frequency power supply 96. The leads 86, 88 are fluidly connected by lines 90, 92 to a coolant source 94 for supplying cooling liquid through the passages of the coil 80 during energization thereof to maintain the same within predetermined operating temperatures.

In operation, the transfer assembly 28 is vertically raised to place the workpiece 12 in magnetically coupled relationship with the coil 80. The motor 70 is energized to rotate the shaft 54, the collet 56 and the workpiece 12 about the axis 74 during the energization of the coil 80 by the power supply 96, thereby establishing a more uniform inductive heating of the gear teeth.

Figure 4:
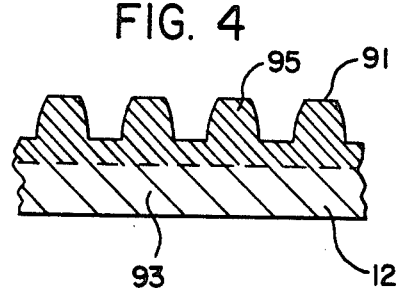
FIG. 4 is an enlarged fragmentary view of the workpiece.

As shown in FIG. 4, following the inductive heating, the outer periphery 91 of the workpiece, including the teeth 95 will be at the austenitizing temperature to a significant depth while the core 93 will be at the preheated isothermal transformation temperature.

Following the inductive heating of the workpiece 12, the drive unit 60 is energized to lower the sleeve 53 and the collet 56 and deposit, upon release of the collet 56, the workpiece 12 into the isothermal quenching zone 18.

Figure 3:
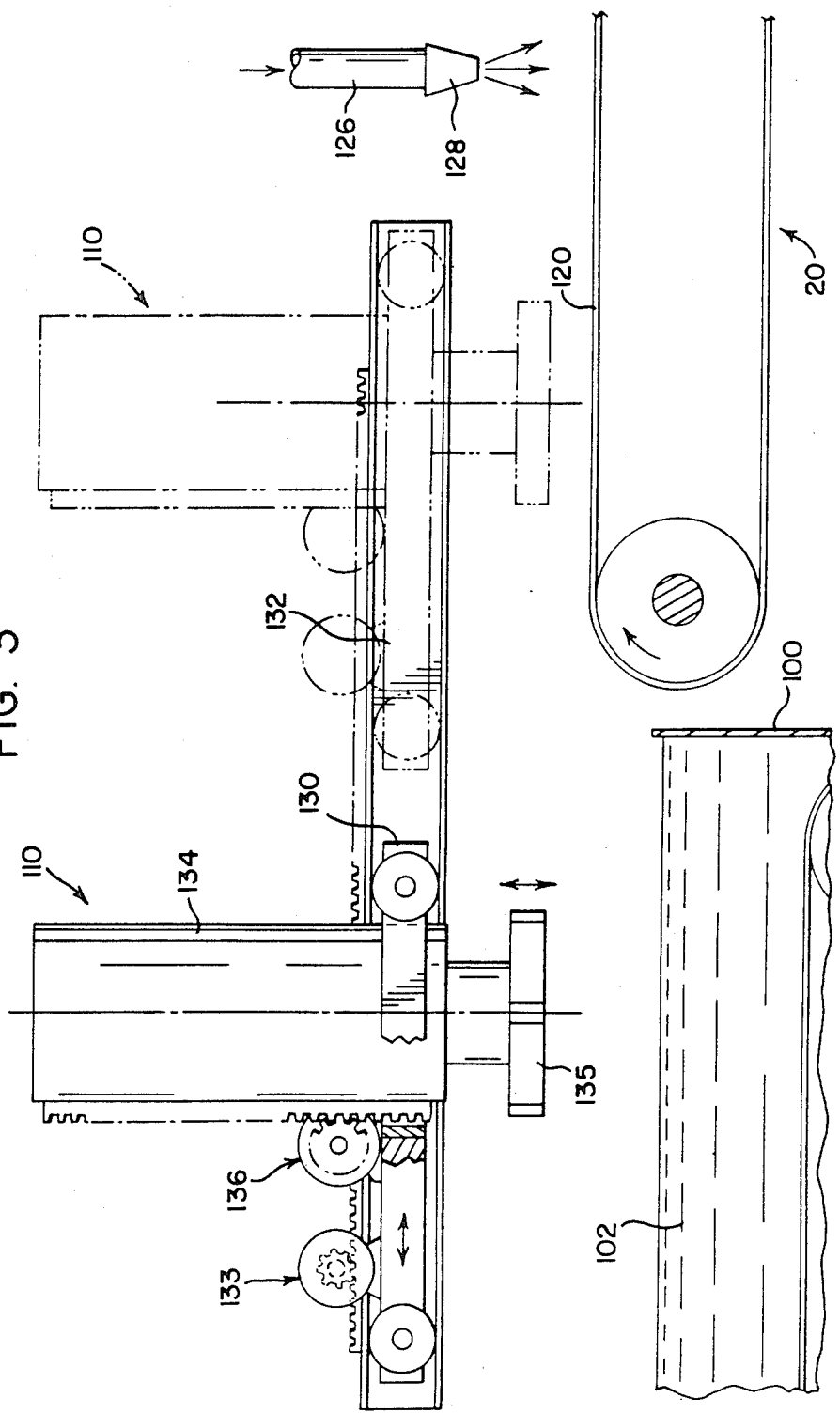
FIG. 3 is a fragmentary view of the quenching zone and cooling zone.

More particularly, the quenching zone 18 comprises an elongated upwardly opening bath 100 containing a high temperature oil 102 and having an endless conveyor belt 104 longitudinally coextensive therewith and immersed in the oil 102. The oil may be of any high temperature oil stable at the isothermal temperature being employed. Alternatively, a conventional molten salt bath may be employed. The oil 102 is supplied to the bath 100 from a source 106 through an inlet line 108 and returns to the source 106 through a discharge line 110. The source 106, or the bath itself, is provided with suitable heating means for maintaining a constant temperature therewithin. Referring to FIG. 3, after depositing the workpiece, the transfer assembly 28 is raised and the platform 30 reciprocated leftwardly to begin the next transfer and inductive heating cycle. Concurrently therewith, the conveyor belt 104 advances the workpieces 12 along the bath 100 at a rate paced with the other unit operations of the apparatus and for the sufficient period of time to isothermally transform the inductively heated portion of the workpiece. At the exit end of the bath, a transfer assembly 110 raises the workpiece 12 from the bath 100 and transfers the same to the cooling zone 20. The speed and/or indexing of the conveyor belt 104 is adjustable to provide for the requisite time at the holding temperature. Thus, for austempering a substantial time is required, while for martempering a reduced time is required. Whatever the cycle, the unit 110 is coordinated with the conveyor belt 104 to interrupt the bath quenching at the appropriate point in the transformation.

More particularly, the cooling zone 20 comprises an endless conveyor belt 120 and a quenching device 122. The quenching device 122 is effective for delivering coolant from a source 124 through line 126 and by means of nozzle 128 spraying cooling liquid onto the workpiece 12 to gradually cool the workpieces from the isothermal temperature to ambient temperature for subsequent processing at the exit end of the conveyor. Alternatively, the length of the conveyor and further downstream processing operations may accommodate air cooling the heated parts.

The transfer assembly 110 is similar to the assembly 29 and comprises a platform 130 reciprocably mounted on framework 132 and driven by drive unit 133 for movement between the leftward position illustrated in solid lines and the rightward position illustrated in dashed lines. The platform 130 carries a vertically reciprocable sleeve assembly 134 which is selectively upwardly and downwardly driven by a rack and pinion drive unit 136. At the leftward position the assembly 134 is lowered into the bath 100 and a collet 135 at the lower end thereof registers with the bore in the workpiece. The collet 135 is then actuated to expand its jaws outwardly to grip the bore surface and the assembly 134 is raised by the drive unit 136. Concurrently therewith or sequentially thereafter the drive unit 133 is actuated to shift the platform and the workpiece rightwardly for depositing the workpiece on the conveyor belt 120.

Operation of the Heat Treating Unit

Figure 5:
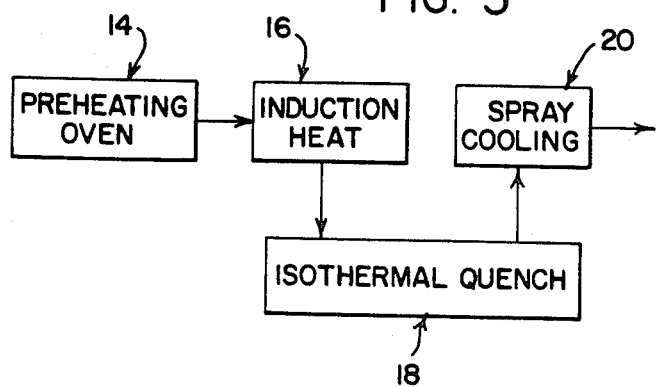
FIG. 5 is a diagram of the heat treating processes of the present invention.

Referring to FIG. 5, the apparatus 10 as described above may be employed for various arrested cooling processes. For the austempering process, the workpieces 12 are transferred to the preheating furnace 24 and the temperature raised along line 200 from ambient temperature 201 through the $M_f$ temperature to a uniform temperature above the $M_s$ temperature and in the range of the desired isothermal transformation temperature. The workpiece is then inductively heated by the coil 80 along line 204 to an elevated temperature 206 above the $A_{c3}$ austenitizing temperature of the workpiece material. The workpiece 12 is then transferred to the bath 100 for quenching of the inductively heated exterior by the quench media 102 and the preheated workpiece portion along line 208 to the predetermined isothermal transformation temperature 210, above the $M_s$ temperature. After a period in the bath sufficient to effect the desired transformation to bainite, the workpiece is transferred to the cooling zone 20 for cooling by the quenching devices along line 212.

For a martempering process, the workpiece 12 is preheated to a temperature 220 below the $M_f$ temperature, inductively heated to the $A_{c3}$ temperature 206, immersed in the bath for quenching along line 222 to the predetermined isolation temperature 224 below the $M_s$ temperature, maintained therein for a time sufficient to complete the transformation to martensite, cooled to ambient temperature and reheated in conventional apparatus not herein described to a tempering temperature and thereafter cooled to ambient. Obviously, variations of both of the above illustrative processes may be employed to obtain the aforementioned benefits of preheating, inductive heating and arrested cooling in an in-line, energy and line efficient heat treating process.

For the austempering process, the workpieces 12 arrive at the entry end of the apparatus from upstream machining or processing operations and are transferred thereon manually or by suitable automatic handling equipment, not shown. The conveyor belt 22 advances the workpieces 12 uniformly or incrementally in coordination with the transfer assembly 28. The entry end of the oven 24 may be provided with suitable automatically actuated doors for minimizing the heat loss from the oven as the parts are sequentially advanced thereinto. The oven 24 has its interior chamber maintained at a predetermined temperature substantially around the isothermal transformation temperature for the part being processed. In this connection, for ferrous ring gears, a temperature in the range of 500°-600° C. would be typical. However, dependent on the part configuration, enhanced isothermal transformation in the quenching zone 18 may be provided by a lesser temperature or in some instances the preheating operation may be omitted. During the preheating operation, the oven cavity 26 may be supplied with an insert atmosphere from the source to prevent oxidation of the workpieces. When a workpiece is adjacent the exit end of the preheating zone 14, the transfer assembly 28 is located in the illustrated leftward position and the collet assembly is lowered into registry with the workpiece bore, the collet jaws 76 are actuated, and the sleeve assembly raised by the drive unit to remove the workpiece 12 from the conveyor belt 22. The workpiece 12 is then raised into magnetically coupled relationship with the inductor coil 80 and the power supply 96 is energized to inductively heat the gear teeth to an austenitizing temperature, as described above. This is accomplished with high frequency, high power density inductive heating over a time interval of about 1 to 5 seconds.

During the inductive heating cycle, the conveyor belt 104 of the bath will have indexed to align a workpiece with the transfer assembly 110 adjacent the exit end and to vacate a conveyor space beneath the heated workpiece. The workpiece 12 is then lowered into the bath 100 and the collet jaws released to deposit the inductively heated workpiece onto the conveyor belt 104 and expose the inductively heated gear teeth to the quenching effects of the workpiece core and the surrounding quenching media. Thus, the inductively heated austenitized regions will undergo rapid and uniform quenching to the isothermal transformation temperature 210 and stabilize thereat. Inasmuch as the austempering properties provided during the isothermal cooling are time dependent, the length of time in the bath must be sufficient to ensure adequate holding time to achieve the desired properties.

As the isothermally cooled workpieces arrive at the exit end of the conveyor belt 104, the workpieces are positioned vertically adjacent the transfer assembly 110. The sleeve assembly 134 is then lowered with the collet 135 registering with the workpiece bore. The collet jaws are actuated and the sleeve assembly is raised and the platform 130 translated rightwardly by the drive unit 133 to locate the workpiece 12 slightly above the cooling conveyor belt 120. The collet jaws are then released to deposit the isothermally heated workpiece onto the cooling conveyor belt 120 which may be moving at a constant speed or may be indexed in synchronization with the line. As the workpieces travel rightwardly on the conveyor belt, the quenching devices 122 deliver coolant onto the workpiece to gradually cool the same to ambient temperatures. The workpieces are thereafter removed from the conveyor manually or by suitable automatic handling equipment, not shown, for further downstream processing operations.

Accordingly, the above process and apparatus provides for energy efficient, in-line processing of ferrous parts through an austempering cycle providing heat treated gear teeth for the workpiece, without the need for austempering the entire section thereof and while still achieving increased hardness, toughness and durability.

I claim:

1. A method of heat treating ferrous workpieces comprising:
    inductively heating a peripheral surface portion of the workpiece to the austenizing temperature thereof to a substantial depth while leaving the remaining core portion of the workpiece substantially below said austenizing temperature;
    rapidly cooling the inductively heated peripheral surface portions of the workpiece in a bath to a predetermined transformation temperature which is above the $M_s$ temperature of the workpiece at a rate at least equal to the critical cooling rate and sufficiently rapid to prevent transformation of the austenite of the austenized peripheral surface portions to intermediate matrix phases during the said rapid cooling thereof;
    maintaining the said workpiece at the said predetermined transformation temperature for a preselected time sufficient to substantially homogenize only said surface portion of said workpiece at said transformation temperature and independently of the temperature of said core portion; and
    then cooling the workpiece to ambient temperature.

2. The method as set forth in claim 1, wherein said elevated temperature is in the lower bainite temperature region of said workpiece's isothermal transformation curve, and said preselected time is sufficient to produce a substantially bainite structure in said workpiece.

3. The method as set forth in claim 1, further including the initial step of preheating the surface portion of said workpiece to an elevated temperature which is above the $M_s$ temperature of said workpiece.

* * * * *